(12) United States Patent
Karpe et al.

(10) Patent No.: US 11,327,645 B2
(45) Date of Patent: *May 10, 2022

(54) SYSTEMS AND METHODS FOR PRELOADING AN AMOUNT OF CONTENT BASED ON USER SCROLLING

(71) Applicant: Asana, Inc., San Francisco, CA (US)

(72) Inventors: Ummon Karpe, San Mateo, CA (US); Louis Lafair, Austin, TX (US)

(73) Assignee: ASANA, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,138

(22) Filed: Apr. 16, 2021

(65) Prior Publication Data
US 2021/0232282 A1   Jul. 29, 2021

Related U.S. Application Data

(63) Continuation of application No. 16/803,615, filed on Feb. 27, 2020, now Pat. No. 10,983,685, which is a continuation of application No. 15/945,472, filed on Apr. 4, 2018, now Pat. No. 10,613,735.

(51) Int. Cl.
| | | |
|---|---|---|
| *G06F 3/0485* | (2013.01) | |
| *H04L 29/08* | (2006.01) | |
| *G06F 16/957* | (2019.01) | |
| *H04L 67/568* | (2022.01) | |

(52) U.S. Cl.
CPC .......... *G06F 3/0485* (2013.01); *G06F 16/957* (2019.01); *G06F 16/9574* (2019.01); *H04L 67/2842* (2013.01)

(58) Field of Classification Search
CPC .. G06F 3/0485; G06F 16/9574; G06F 16/957; H04L 67/2842
See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,608,898 A | 3/1997 | Turpin |
| 5,611,076 A | 3/1997 | Durflinger |

(Continued)

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |

OTHER PUBLICATIONS

Asset, F., Cassius, T. S., & Maria, T. S. (2018). Confrontation between techniques of time measurement. Journal of Manufacturing Technology Management, 29(5), 789-810. (Year: 2018).

(Continued)

*Primary Examiner* — Nicholas Ulrich
(74) *Attorney, Agent, or Firm* — Esplin & Associates, PC

(57) ABSTRACT

Systems and methods for preloading an amount of content based on user scrolling are disclosed. A body of content may be presented that takes up a certain amount of display space within a graphical user interface. Scroll information characterizing user scrolling within the graphical user interface may be obtained. A portion of the body of content outside a field of view of the graphical user interface may be determined based on the scroll information.

20 Claims, 6 Drawing Sheets

(56) References Cited

U.S. PATENT DOCUMENTS

| | | |
|---|---|---|
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | David |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 | 3/2022 | Koch |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |

(56) References Cited

U.S. PATENT DOCUMENTS

| | | |
|---|---|---|
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0189017 A1 | 7/2014 | Prakash |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |

(56) References Cited

U.S. PATENT DOCUMENTS

| | | |
|---|---|---|
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1* | 2/2018 | Hui ..................... G06F 16/9574 |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère et al. |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |

OTHER PUBLICATIONS

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis &Terrie Shannon, "Synchronous Chat," Aug. 2016, Dept. of Education, Univ. of MN Duluth, web.archive.org/web/20160825183503/https://www.d.umn.edu/hrallis/professional/

(56) References Cited

OTHER PUBLICATIONS presentations/cotfsp06/indiv_tools/sync_chat.htm (Year: 2016) (2 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
"How to Asana: Inviting teammates to Asana." YouTube, Asana, Mar. 21, 2017, https://www.youtube.com/watch?v=TLOruY1KyxU (Year: 2017), 13 pages.
Asana Demo and Product Tour, you tube excerpt, Dec. 7, 2017 https://www.youtube.com/watch?v=lMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, Wikipedia, archives org, Mar. 16, 2018 https://web.archive.org/web/20180316193655/https://en.wikipedia.org/wiki/Command_and_control (Year: 2018), 6 pages.
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
Hartmann, "TimeProjectscheduling with resource capacities and requests varying with time: a case study," 2013, Flexible services and manufacturing journal, vol. 25, No. 1, pp. 74-93 (Year: 2013).
Paul Minors, How to automate your tasks, youtube excerpts, Oct. 18, 2019 https://www.youtube.com/watch?v=lwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Tiburca, Andrew) Best Team Calendar Applications for 2018—Toggl https://toggl.com/blog/best-team-calendar-applications-for-2018 (Year: 2017).
Macro, computer science, Wikipedia, archives org Feb. 11, 2020 http://web.archive.org/web/20200211082902/https://en.wikipedia.org/wiki/Macro_(computer_science) (Year: 2020).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

* cited by examiner

SYSTEMS AND METHODS FOR PRELOADING AN AMOUNT OF CONTENT BASED ON USER SCROLLING

FIELD OF THE DISCLOSURE

The present disclosure relates to systems and methods for preloading an amount of content based on user scrolling.

BACKGROUND

Caching and/or preloading content for a webpage may prevent users from having to wait to refresh the page while scrolling. How much content to cache and/or preload is typically the same for all users. However, some users may scroll more and/or faster than others causing them to have to wait to refresh the page. Some users may scroll less than other users, causing an unnecessary waste in bandwidth, processing, and/or storage costs.

SUMMARY

One aspect of the present disclosure relates to a system that caches (i.e., preloads) the right amount of content so that a user does not have to wait to re-fresh while scrolling. The system also avoids over caching which wastes valuable resources (e.g., bandwidth, processing, storage costs, etc.). Different users and/or different scrolling devices (e.g., mouse, roll bar, scroll bars, etc.) may scroll different amounts and/or at different speeds. Caching the same amount of content for all users and/or scrolling devices is inefficient and may cause user frustration and/or resource waste (e.g., cost of unnecessary bandwidth, processing, and/or storage). The present disclosure provides a solution whereby more content is preloaded (than was previously preloaded) as a user scrolls. In some implementations, the amount of preloaded content obtained and/or the amount of content preloaded may be determined based on the user, their scroll statistics, the content being scrolled, machine learning, and/or other information. By way of non-limiting example, the amount of content cached and/or preloaded may be proportional to the height and/or amount of content already viewed by the user (e.g., via scrolling). As such, as the user scrolls, more content than was previously cached is cached to facilitate further scrolling. As such, by way of example, the amount of content cached may better fit the user, content, and/or scenario.

One aspect of the present disclosure relates to a system configured to preload an amount of content based on user scrolling. The system may include one or more physical processors configured by machine-readable instructions. In some implementations, a system configured to preload an amount of content based on user scrolling may include one or more of: one or more physical processors, electronic storage, and/or other components. The client computing platforms may be configured to communicate with one or more servers according to a client/server architecture. The client computing platform(s) may include one or more physical processors configured to execute one or more computer program components. The computer program components may include one or more of a display space component, a caching component, a scroll component, and/or other components.

The display space component may be configured to effectuate presentation of a body of content that takes up a certain amount of display space within a graphical user interface. A field of view may be a portion of the display space visible to a user. The display space may be scrollable such that the field of view is able to be scrolled around the display space to view the body of content. The field of view may change as the user scrolls. The preloaded content may comprise content that is outside the second field of view when it is obtained. The preloaded content may become content within a current field of view as a user scrolls.

The caching component may be configured to obtain first content information that defines a first portion of the body of content. The first portion of the body of content may include first content presented within a first field of view of the graphical user interface. The first portion of the body of content may include first preloaded content that is outside the field of view of the graphical user interface. In some implementations, first pre-loaded content that is outside the current field of view (e.g., a first field of view) when it is obtained may not stay outside the current field of view. By way of non-limiting example, the preloaded content may become content presented within the field of view responsive to the user scrolling within the display space.

The scroll component may be configured to obtain scroll information. The scroll information may characterize user scrolling within the graphical user interface. The scroll information may indicate a first scrolling of the graphical user interface by a first user. In some implementations, the scroll information may comprise scroll input from a user initiating scrolling of the graphical user interface. The scroll information may indicate historical scroll information. The historical scroll information may include one or more of an average scroll speed, an average scroll amount, an average scroll distance, a change in scrolling characteristics, and/or other scroll information. In some implementations, the scroll information may indicate a type of content the user is scrolling. The scroll information may indicate whether or not a user has reached and/or surpassed a threshold amount of scrolling and/or a threshold level within the graphical user interface (e.g., via scrolling). In some implementations, the scroll component may be configured to obtain second scroll information indicating a second scrolling of the graphical user interface by the first user.

The caching component may be configured to obtain a second portion of the body of content. The second portion of the body of content may be obtained based on the scroll information. The second portion of the body of content may include second preloaded content that is outside a current field of view of the graphical user interface (e.g., a second field of view). A second amount of the second preloaded may be determined based on the scroll information. The second amount of the second preloaded content included in the second content information may be greater than a first amount of the first preloaded content included in the first content information.

Caching component may be configured to obtain the second content information responsive to the first scrolling reaching and/or surpassing a first threshold amount of scroll and/or a first threshold level within the graphical user interface. In some implementations, caching component may be configured to obtain third content information. The third content information may be obtained responsive to the second scrolling. The third content information may define a third portion of the body of content based on the second scroll information. The third portion of the body of content may include third preloaded content that is outside the third field of view of the graphical user interface. A third amount of the third preloaded content may be determined based on the second scroll information and/or the scroll information.

In some implementations, the third amount of the third preloaded content may be greater than the second amount of the second preloaded content. Responsive to the second scroll being longer, farther, and/or faster than the first scroll, the third amount of preloaded content may be greater than the second amount of the second preloaded content. In some implementations, the third amount of the third preloaded content may be equal to the second amount of the second preloaded content.

In some implementations, the content may include one or more of: collaboration environment content, game content, virtual space content, blog content, social network content, text content, image content, and/or other content. By way of non-limiting example, the graphical user interface may comprise a work management interface including one or more visual content items corresponding to one or more of the units of work managed, created, and/or assigned within the collaboration environment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
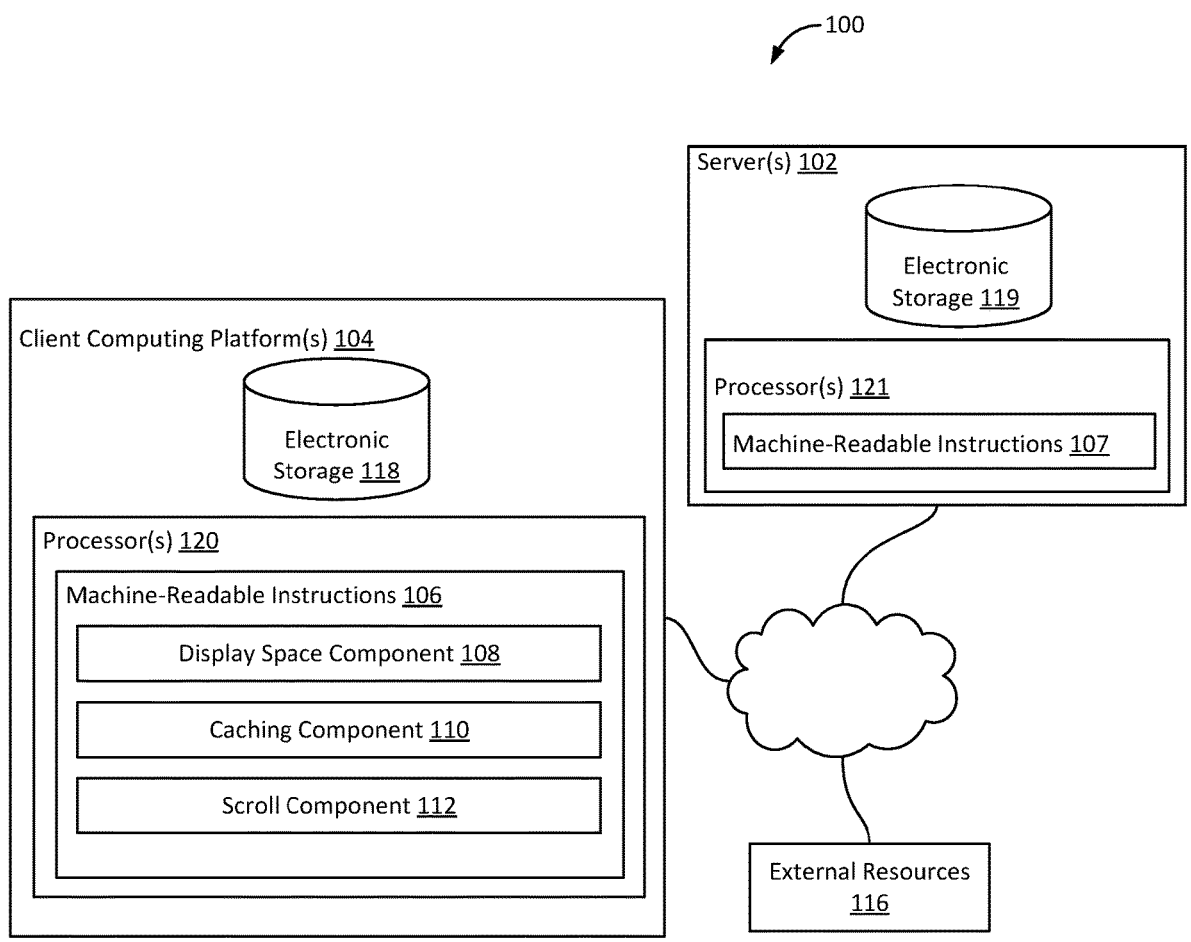
FIG. 1 illustrates a system configured to preload an amount of content based on user scrolling, in accordance with one or more implementations.

FIG. 1 illustrates a system 100 configured to preload an amount of content based on user scrolling, in accordance with one or more implementations. In some implementations, the system may cache and/or preload a greater amount of content (i.e., preloaded content) based on user scrolling. System 100 may include one or more client computing platform(s) 104. Client computing platform(s) 104 may be configured to communicate with one or more servers 102 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, client computing platform(s) 104 may be fat and/or thick clients that have rich functionality independent of server(s) 102.

Cached (i.e., preloaded) content may include content not currently visible in the field of view. In other words, preloaded content is that is outside the current field of view at the time it is preloaded. The preloaded content may become visible within a future field of view responsive to a user performing a scroll. Caching and/or preloading content may enable a user to scroll the content without having to wait to refresh. Preloaded content may include one or more chunks of cached and/or preloaded content obtained by the client computing platform(s) 104 to present within the graphical user interface. By way of non-limiting example, the body of content may be displayed within a webpage such that caching and/or preloading portions of the content includes temporarily storing web documents associated with the body of content, to reduce server lag such that user can scroll without delay.

In some implementations, the content may include one or more of: collaboration environment content, game content, virtual space content, blog content, social network content, text content, image content, video content, and/or other content. Collaboration environment content may include content that facilitates work management via a collaboration environment.

Presentation of the collaboration environment content is effectuated based on environment state information including user records and work unit records. The environment state information may define a state of the collaboration environment including user states and work unit states. The user state may be defined by the user records. The user records define values of user parameters associated with users interacting with and/or viewing the collaboration environment. The work unit states are defined by the work unit records that define values of work unit parameters for units of work managed, created, and/or assigned within the collaboration environment. By way of non-limiting example, the graphical user interface may comprises a work management interface. The graphical user interface may include one or more visual content items corresponding to one or more of the units of work managed, created, and/or assigned within the collaboration environment.

Client computing platform(s) 104 may be configured by machine-readable instructions 106. Machine-readable instructions 106 may include one or more instruction components. The instruction components may include computer program components. The instruction components may include one or more of display space component 108, caching component 110, scroll component 112, and/or other instruction components.

Display space component 108 may be configured to effectuate presentation of a body of content that takes up a certain amount of display space within a graphical user interface. The display space may include a portion of the graphical user interface in which the body of content is presented. A field of view may be a portion of the display space that is visible to a user at a given point in time. The field of view may be able to be scrolled around the display space to view the body of content. The field of view may change as the user scrolls around the display space. A first field of view may include the field of view at a first time and/or scroll location, a second field of view may include the field of view at a second time and/or scroll location, a third field of view at a third time and/or scroll location, a fourth field of view at a fourth time and/or scroll location, and/or an nth field of view may include the field of view at an n time and/or scroll location.

Figure 2A:
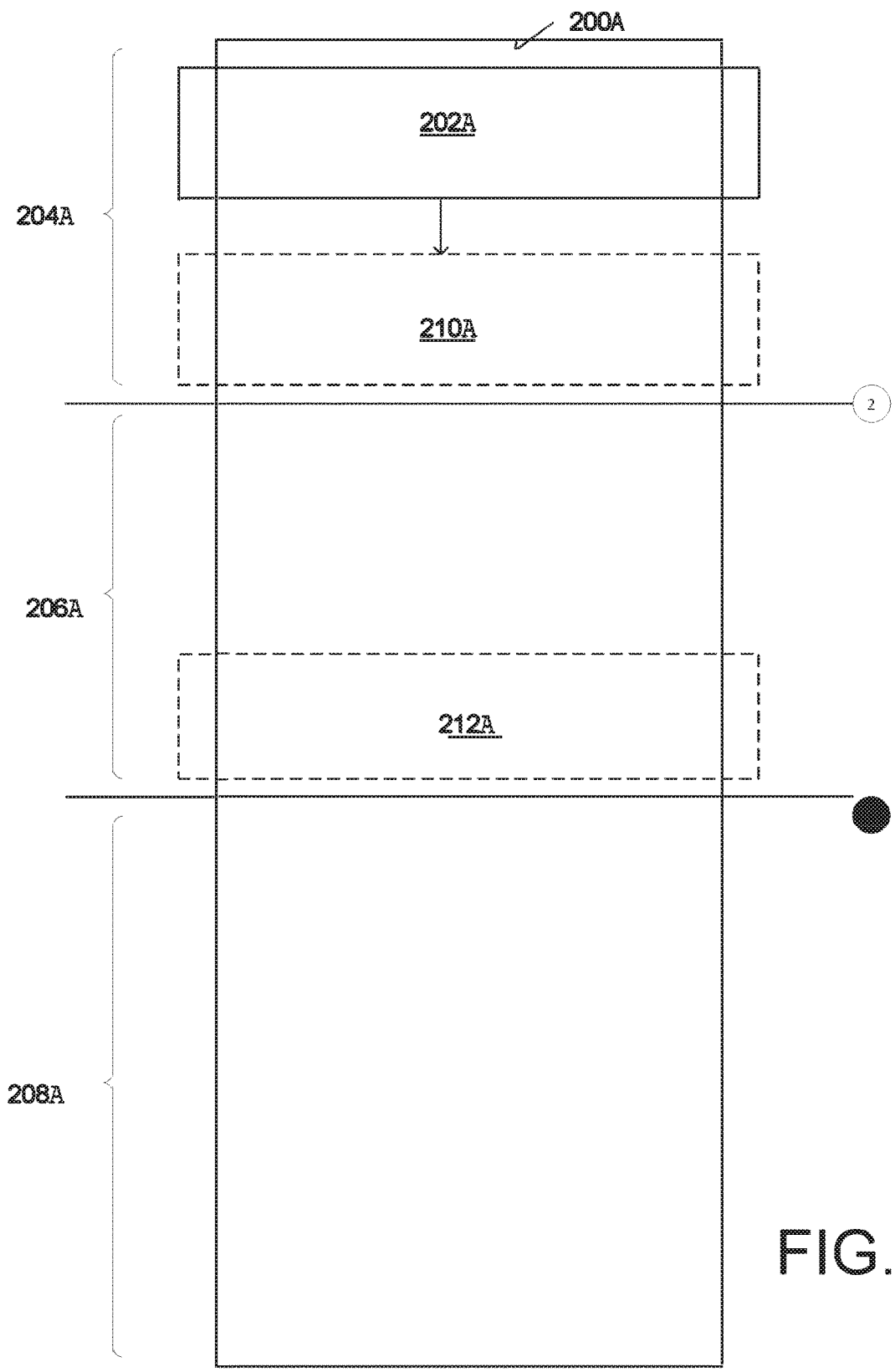
FIG. 2A illustrates an exemplary body of content including multiple portions of the body of content, in accordance with one or more implementations.

FIG. 2A illustrates an exemplary body of content including multiple portions of the body of content, in accordance with one or more implementations. Body of content 200A may include first portion 204A, second portion 206A, third portion 208A, and/or other portions of body of content 200A. First content information defining first portion 204A may be obtained (e.g., during a first cache). First portion 204A may include first content presented within first field of view 202A. First portion 204A may include first preloaded content that is outside the first field of view of the graphical user interface. First field of view 202A may be scrolled around to view body of content 200A. As the user scrolls, first field of view 202A may change and move to second field of view 210A (with or without one or more fields of view in between as the user scrolls).

Second portion 206A may include second preloaded content that is outside second field of view 210A of the graphical user interface. Second portion 206A may be preloaded during a second cache responsive to the field of view being scrolled such that it approaches the end of first portion 204A and/or second field of view 210A. Third portion 208A may include third preloaded content that is outside third field of view 212A. Third portion 208A may be preloaded during a third cache responsive to the field of view being scrolled such that it approaches the end of second portion 206A and/or third field of view 212. Second portion 206A and/or third portion 208A may be determined based on the scroll information such that an amount of the body of content that is preloaded in portions (e.g., the first portion 204A, the second portion 206A, the third portion 208A, and/or other portions) is determined based on the scroll information.

In FIG. 2A, a first amount of first preloaded content may include a standard and/or pre-determined amount of preloaded content. A third amount of third preloaded content may be greater and/or bigger than a second amount of second preloaded content. Second amount of second preloaded content may be determined based on scroll information characterizing user scrolling. Responsive to a user scrolling to a first threshold level, the scroll information may characterize the user's scrolling to reach first threshold level. By way of non-limiting example, the scroll information may indicate a height of content the user has already viewed when the field of view reaches first threshold.

The second amount of second preloaded content may be obtained and/or determined based on the scroll information. By way of non-limiting example, second amount of second preloaded content may be obtained and/or determined based on height of content the user has already viewed responsive to the first scrolling. Third amount of third preloaded content may be obtained and/or determined based on the scroll information. By way of non-limiting example, third amount of third preloaded content may be obtained and/or determined based on height of content the user has already viewed responsive to a first and/or second scrolling. Third amount of third preloaded content may be larger and/or greater than second amount of second preloaded content. By way of non-limiting example, third amount of third preloaded content may be larger than second amount of second preloaded content because the scroll information indicates the user is scrolling more (e.g., compare heights) so more content should be preloaded.

Caching component 110 may be configured to obtain first content information. The first content information may define a first portion of the body of content. By way of non-limiting example, content information may include web documents, plain text, HTML, XML, JSON, text, images, video, video, stylesheets, and/or other content information. The first portion of the body of content may include first preloaded content. A first amount of first preloaded content may be included in the first portion of the body of content. The first amount of preloaded content may include content that is included in a first field of view, the first preloaded content, and/or other content. In some implementations, caching component 110 may be configured to cache the first portion of the body of content.

Scroll component 112 may be configured to obtain scroll information. Scroll information may characterize user scrolling within the graphical user interface. Scroll information may indicate one or more of a distance of one or more scrolls, an amount of one or more scrolls, a quantity of scrolls, a speed of one or more scrolls, a duration of one or more scrolls, a history and/or average of one or more scrolls, the user performing the one or more scrolls, the type of content being scrolled, the amount of content scrolled, and/or other scroll information. The scroll information may indicate how much a user has scrolled and/or is likely to scroll in the future.

Scroll component 112 may track user scrolling via one or more scrolling devices. The one or more scrolling devices may include input devices through which a user is able to be scrolled around the display space to view the body of content. The one or more scrolling devices may include one or more of a mouse, a scroll bar, a roll bar, a keyboard, a hand tool icon/mouse combination, a touch screen, and/or other scrolling devices.

In some implementations, the scroll information may indicate a first scrolling of the graphical user interface by a first user. In some implementations, the scroll information may comprise scroll input from a user initiating scrolling of the graphical user interface. The scroll information may indicate historical scroll information characterizing a user's and/or multiple users' scrolling over a period of time. By way of non-limiting example, the historical scroll information may include one or more of an average scroll speed, an average scroll amount, a median scroll amount, an average scroll distance, a median scroll distance, a height and/or amount of content already viewed by the user (how far the user has scrolled), a change in scrolling characteristics, a distance of one or more scrolls per unit of time, an amount of one or more scrolls per unit of time, a quantity of scrolls per unit of time, a distance and/or quantity of scrolls in relation to maximum page size, a length of time since previous scrolling, and/or other scroll information. In some implementations, the scroll information may indicate a type of content the user is scrolling. The scroll information may or may not be user specific (for the scrolling user). In some implementations, the scroll information may be based on multiple users.

The scroll information may include the type of content the user is scrolling. As such, the scroll information may indicate whether the user is scrolling one or more of: collaboration environment content, game content, virtual space content, blog content, social network content, text content, image content, and/or other content. In some implementations, the scroll information may indicate a type of content within one or more of the categories of content. By way of non-limiting example, the scroll information may indicate the user is scrolling a task list, a project list, a board list, a sidebar, an inbox, and/or other types of content within the collaboration environment content category.

In some implementations, the scroll information may indicate whether or not a user has reached and/or surpassed a threshold amount of scrolling and/or a threshold level within the graphical user interface (e.g., via scrolling). Scroll component 112 may be configured to monitor and/or track user scrolling within the graphical user interface and/or determine if a user has reached and/or surpassed a threshold amount of scrolling and/or a threshold level within the graphical user interface. Responsive to one or more thresholds being met and/or surpassed, scroll component 112 may be configured to trigger caching component 110 to obtain additional portions of the body of content so the user does not have to wait and/or refresh the page.

In some implementations, the amount of preloaded content obtained and/or the amount of content preloaded may be determined based on machine learning algorithms. By way of non-limiting example, scroll component 112 may be configured to log the scroll information, subsequent scroll distance, and/or other information. Scroll component 112 may be configured to run machine learning on the logged scroll information, subsequent scroll distance, and/or other information to determine a predictive model of how far a user is likely to scroll in the future at any given time.

Figure 2B:
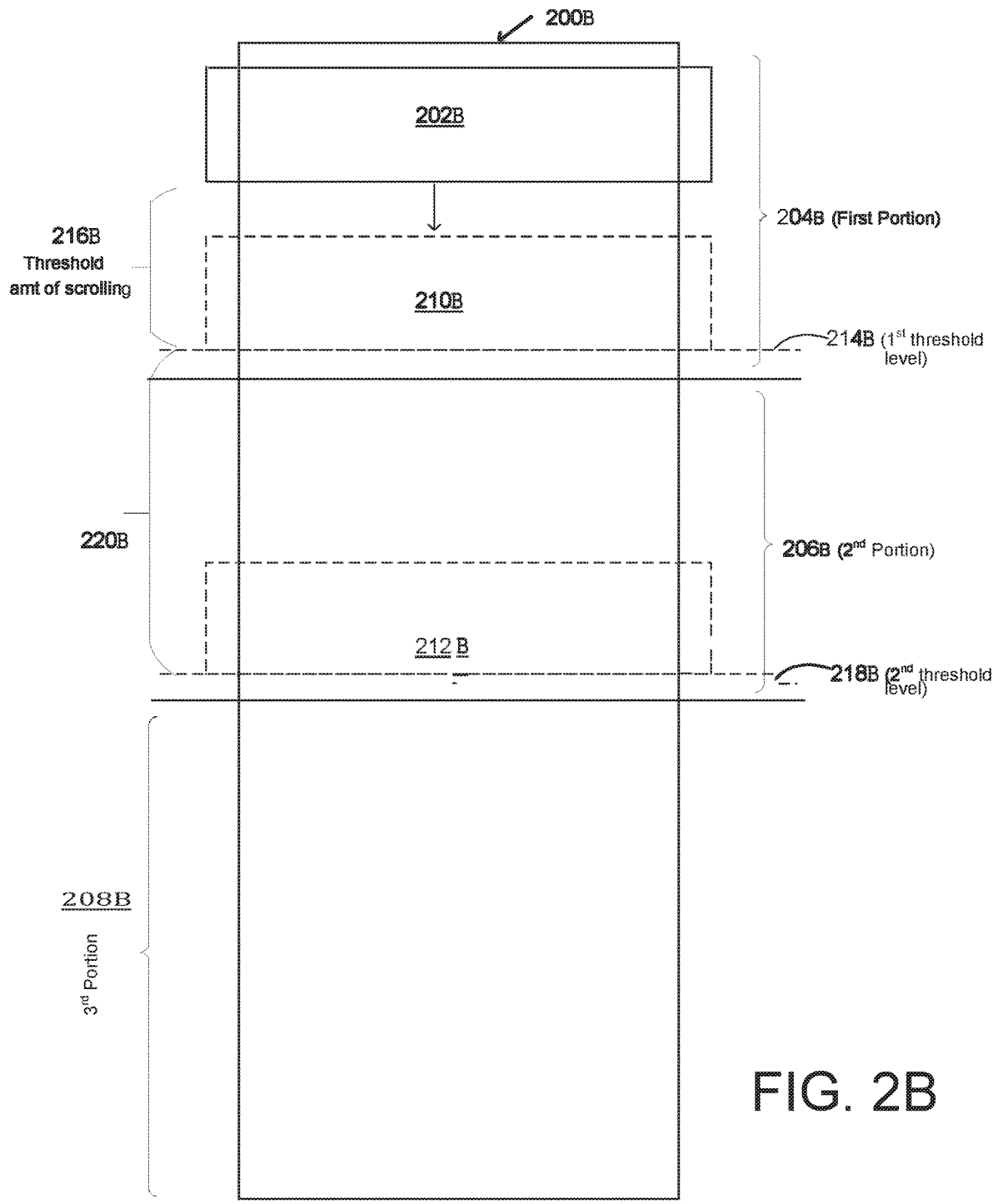
FIG. 2B illustrates an exemplary body of content including scrolling thresholds, in accordance with one or more implementations.

FIG. 2B illustrates an exemplary body of content including multiple portions of the body of content, in accordance with one or more implementations. Body of content 200B may include first portion 204B, second portion 206B, third portion 208B, and/or other portions of body of content 200B. First content information defining first portion 204B may be obtained (e.g., during a first cache). First portion 204B may include first content presented within first field of view 202B. First portion 204B may include first preloaded content that is outside the first field of view of the graphical user interface. First field of view 202B may be scrolled around to view body of content 200B. As the user scrolls, first field of view 202B may change and move to second field of view 210B (with or without one or more fields of view in between as the user scrolls).

Second portion 206B may include second preloaded content that is outside second field of view 210B of the graphical user interface. Second portion 206B may be preloaded during a second cache responsive to the field of view being scrolled such that it reaches first threshold level 214B and/or is scrolled a first threshold amount 216B (a height the field of view was scrolled from first field of view 202B to second field of view 210B). Third portion 208B may include third preloaded content that is outside third field of view 212B. Third portion 208B may be preloaded during a third cache responsive to the field of view being scrolled such that it reaches second threshold level 218B and/or is scrolled a second threshold amount 220B (a height the field of view was scrolled from second field of view 210B to third field of view 212B). Second portion 206B and/or third portion 208B may be determined based on the scroll information such that an amount of the body of content that is preloaded in portions (e.g., the first portion 204B, the second portion 206B, the third portion 208B, and/or other portions) is determined based on the scroll information. By way of non-limiting example, an amount of the body of content that is preloaded in portions (e.g., the first portion 204B, the second portion 206B, the third portion 208B, and/or other portions) may be determined based on the first threshold amount 216B of scrolling and/or the second threshold amount 220B of scrolling.

Returning to FIG. 1, in some implementations, the scroll information may be obtained on a continuous or semi-continuous basis. As such, the scroll information may be obtained and/or updated after each scroll. In some implementations, the scroll information may be obtained and/or updated periodically based on one or more recent scrolls, all of the user scrolls, one or more scrolls in a given time period, one or more other user scrolls, and/or other scrolls.

In some implementations, scroll component 112 may be configured to obtain second scroll information indicating a second scrolling of the graphical user interface by the first user. Scroll component 112 may compare one or more portions of scroll information to identify changes and/or differences. By way of non-limiting example, the scroll information may include a comparison of two or more portions of scroll information (e.g., first scroll information, second scroll information, etc.). In some implementations, scroll information may characterize a user's scroll for a third, fourth, fifth, sixth, and/or nth scrolling.

Caching component 110 may be configured to obtain a second portion of the body of content. The second portion of the body of content may be obtained based on the scroll information. The second portion of the body of content may include second preloaded content that is outside a second field of view of the graphical user interface. In some implementations, responsive to the user scrolling and the field of view moving from the field of view to a second field of view (that may display a portion of the second preloaded content) the second portion of the body of content may include second content presented within the second field of view and/or the second preloaded content. Prior to the user scrolling and the first fled of view moving from the first field of view to a second field of view, the second portion of the body of content may all be second preloaded content outside the field of view. A second amount of the second preloaded content may be greater than a first amount of the first preloaded content. The second amount of preloaded content may be determined based on the scroll information. Responsive to the user scrolling at least a threshold amount, more than the user previously scrolled, and/or more than a typical or average amount of scrolling, the second amount of the second preloaded content may be greater than the first amount of the first preloaded content. In some implementations, caching component 110 may be configured to cache the second portion of the body of content.

By way of non-limiting example, the second amount of second preloaded content may be proportional to the amount of the body of content the user has already viewed, and/or the amount, distance, and/or speed the first user has scrolled. Such that by way of non-limiting example, responsive to a user scrolling more, more content is preloaded because it may be likely the user will continue scrolling.

In some implementations, caching component 110 may be configured to obtain third content information. The third content information may define a third portion of the body of content based on the second scroll information. The third portion of the body of content may include third preloaded content. The third preloaded content may be outside the third field of view. A third amount of the third preloaded content may be determined by caching component 110 based on the second scroll information, the scroll information, and/or other information. In some implementations, caching component 110 may be configured to cache the third portion of the body of content.

In some implementations, other portions of content and/or preloaded content may be obtained and/or presented between the first portion of content, the second portion of content, and/or the third portion of content. In other words, the second portion of content (including the second amount of the second preloaded content) and/or third portion of content (including the third amount of the third preloaded content) may represent a $2^{nd}$ cache, a $3^{rd}$ cache, a $4^{th}$ cache, $5^{th}$ cache, a $6^{th}$ cache, an $n^{th}$ cache, and/or any other cache.

In some implementations, the third amount of the third preloaded content may be greater than the second amount of the second preloaded content. As the user scrolls more, more preloaded content may be obtained. By way of non-limiting example, the third amount of third preloaded content may be determined based on (e.g., to be proportional to) the height of the content already viewed by the user (e.g., via scrolling), and/or otherwise based on user scrolling.

Figure 3A:
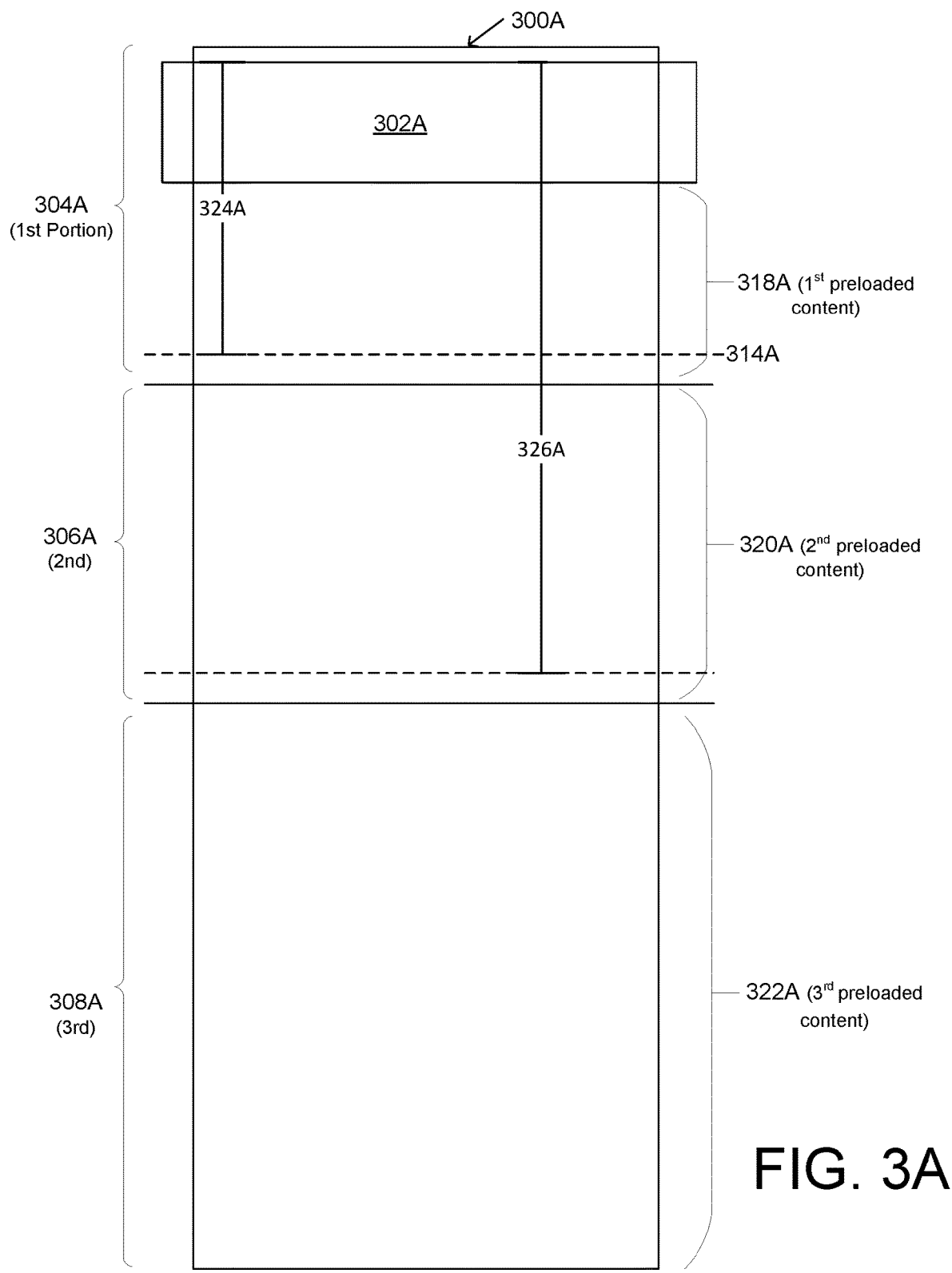
FIG. 3A illustrates exemplary amounts of pre-loaded content, in accordance with one or more implementations.

FIG. 3A illustrates an exemplary body of content including first preloaded content, second preloaded content, and/or other content. Body of content 300A may include first portion 304A, second portion 306A, third portion 308A, and/or other portions of body of content 300A. First field of view 302A may be scrolled around to view body of content 300A. A first amount 318A of first preloaded content 318A may include a standard and/or pre-determined amount of pre-loaded content. A third amount 322A of third preloaded content may be greater and/or bigger than a second amount 320A of second preloaded content. Second amount 320A of second preloaded content may be determined based on scroll information characterizing user scrolling. Responsive to a user scrolling to first threshold level 314A, the scroll information may characterize the user's scrolling to reach first thresh old level 314A. By way of non-limiting example, the scroll information may indicate a height 324A of content the user has already viewed when the field of view reaches first threshold 314A. Second amount 320A of second preloaded content may be obtained and/or determined based on the scroll information. By way of non-limiting example, second amount 320 of second preloaded content may be obtained and/or determined based on height 324A of content the user has already viewed responsive to the first scrolling. Third amount 322A of third preloaded content may be obtained and/or determined based on the scroll information. By way of non-limiting example, third amount 322A of third preloaded content may be obtained and/or determined based on height 326A of content the user has already viewed responsive to a first and/or second scrolling. Third amount 322A of third preloaded content may be larger and/or greater than second amount 320A of second preloaded content. By way of non-limiting example, third amount 322A of third preloaded content may be larger than second amount 320A of second preloaded content because the scroll information indicates the user is scrolling more (e.g., height 326A compared to height 324A) so more content should be preloaded.

Returning to FIG. 1, in some implementations, the third amount of the third preloaded content may be equal to the second amount of the second preloaded content. The second amount of second preloaded content, third amount of third preloaded content, and/or another amount of other preloaded content, may be determined and/or obtained by caching component 110 based on the scroll information. In some implementations, the scroll information may characterize user scrolling over a period of time such that responsive to a determination (e.g., by caching component 110, one or more servers, and/or one or more other components) of the amount of content to pre-load in the future, the amount content preloaded from that point forward is consistent (e.g., until the scroll information is updated and/or changes).

Figure 3B:
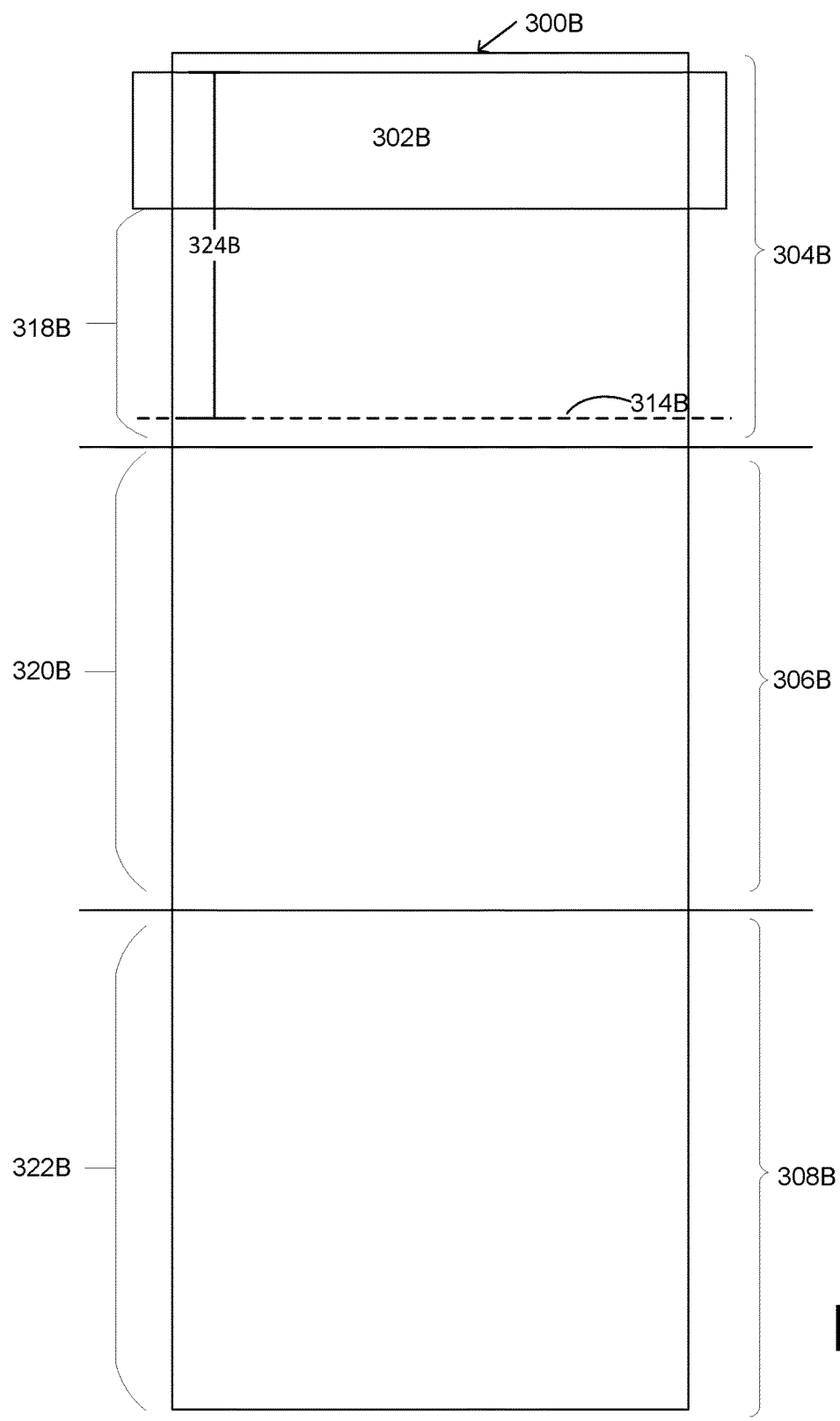
FIG. 3B illustrates exemplary amounts of pre-loaded content, in accordance with one or more implementations.

FIG. 3B illustrates an exemplary body of content including first preloaded content, second preloaded content, and/or other content. Body of content 300B may include first portion 304B, second portion 306B, third portion 308B, and/or other portions of body of content 300B. First field of view 302B may be scrolled around to view body of content 300B. A first amount 318B of first preloaded content 318B may include a standard and/or pre-determined amount of pre-loaded content. A second amount 320B of second preloaded content and/or a third amount 322B of third preloaded content may be equal and/or near equal. Second amount 320B of second preloaded content may be determined based on scroll information characterizing user scrolling. Responsive to a user scrolling to first threshold level 314B, the scroll information may characterize the user's scrolling to reach first threshold level 314B. By way of non-limiting example, the scroll information may indicate a height 320B of content the user has already viewed when the field of view reaches first threshold 314B. Second amount 320 of second preloaded content and/or third amount 322B of third preloaded content may be obtained and/or determined based on the scroll information. By way of non-limiting example, second amount 320B of second preloaded content and/or third amount 322B of third preloaded content may be obtained and/or determined based on height 320B of content the user has already viewed.

Returning to FIG. 1, in some implementations, caching component 110 may be configured to obtain a third, fourth, fifth, sixth, and/or nth portion of the body of content responsive to user scrolling.

In some implementations, client computing platform(s) 104, server(s) 102, and/or external resources 110 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which client computing platform(s) 104, server(s) 102, and/or external resources 110 may be operatively linked via some other communication media.

A given client computing platform 104 may include one or more processors configured to execute computer program components. The computer program components may be configured to enable a user associated with the given client computing platform 104 to interface with system 100 and/or external resources 110, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. By way of non-limiting example, a given client computing platform 104 may include a "thick" or "fat" client that have rich functionality independent of server(s) 102.

External resources 110 may include sources of information outside of system 100, external entities participating with system 100, and/or other resources. In some implementations, some and/or all of the functionality attributed herein to external resources 110 may be provided by resources included in system 100.

Server(s) 102 may include electronic storage 118 and/or 119, one or more processors 121, and/or other components. Processor(s) 121 may be configured by machine-readable instructions 107. Server(s) 102 may include communication lines, and/or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 and/or 119 may comprise non-transitory storage media that electronically stores information. The electronic storage media of electronic storage 118 and/or 119 may include one and/or both of system storage that is provided integrally (i.e., substantially non-removable) with server(s) 102 and/or removable storage that is removably connectable to server(s) 102 via, for example, a port (e.g., a USB port, a firewire port, etc.) and/or a drive (e.g., a disk drive, etc.). Electronic storage 118 and/or 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 and/or 119 may include one or more virtual storage resources (e.g., cloud storage, a virtual private network, and/or other virtual storage resources). Electronic storage 118 and/or 119 may store software algorithms, information determined by processor(s) 120 and/or 121, information received from server(s) 102, information received from client computing platform(s) 104, and/or other information that enables server(s) 102 to function as described herein.

Processor(s) 120 and/or 121 may be configured to provide information processing capabilities in server(s) 102. As such, processor(s) 120 and/or 121 may include one or more of a digital processor, an analog processor, a digital circuit designed to process information, an analog circuit designed to process information, a state machine, and/or other mechanisms for electronically processing information. Although processor(s) 120 and/or 121 is shown in FIG. 1 as a single entity, this is for illustrative purposes only. In some implementations, processor(s) 120 and/or 121 may include a plurality of processing units. These processing units may be physically located within the same device, and/or processor(s) 120 and/or 121 may represent processing functionality of a plurality of devices operating in coordination. Processor(s) 120 and/or 121 may be configured to execute components 108, and/or other components. Processor(s) 120 and/or 121 may be configured to execute components 108, and/or other components by software; hardware; firmware; some combination of software, hardware, and/or firmware; and/or other mechanisms for configuring processing capabilities on processor(s) 120 and/or 121. As used herein, the term "component" may refer to any component and/or set of components that perform the functionality attributed to the component. This may include one or more physical processors during execution of processor readable instructions, the processor readable instructions, circuitry, hardware, storage media, and/or any other components.

It should be appreciated that although components and 108 are illustrated in FIG. 1 as being implemented within a single processing unit, in implementations in which processor(s) 120 and/or 121 includes multiple processing units, one or more of components and/or 108 may be implemented remotely from the other components. The description of the functionality provided by the different components and/or 108 described below is for illustrative purposes, and is not intended to be limiting, as any of components and/or 108 may provide more and/or less functionality than is described. For example, one or more of components and/or 108 may be eliminated, and some and/or all of its functionality may be provided by other ones of components and/or 108. As another example, processor(s) 120 and/or 121 may be configured to execute one or more additional components that may perform some and/or all of the functionality attributed below to one of components and/or 108.

Figure 4:
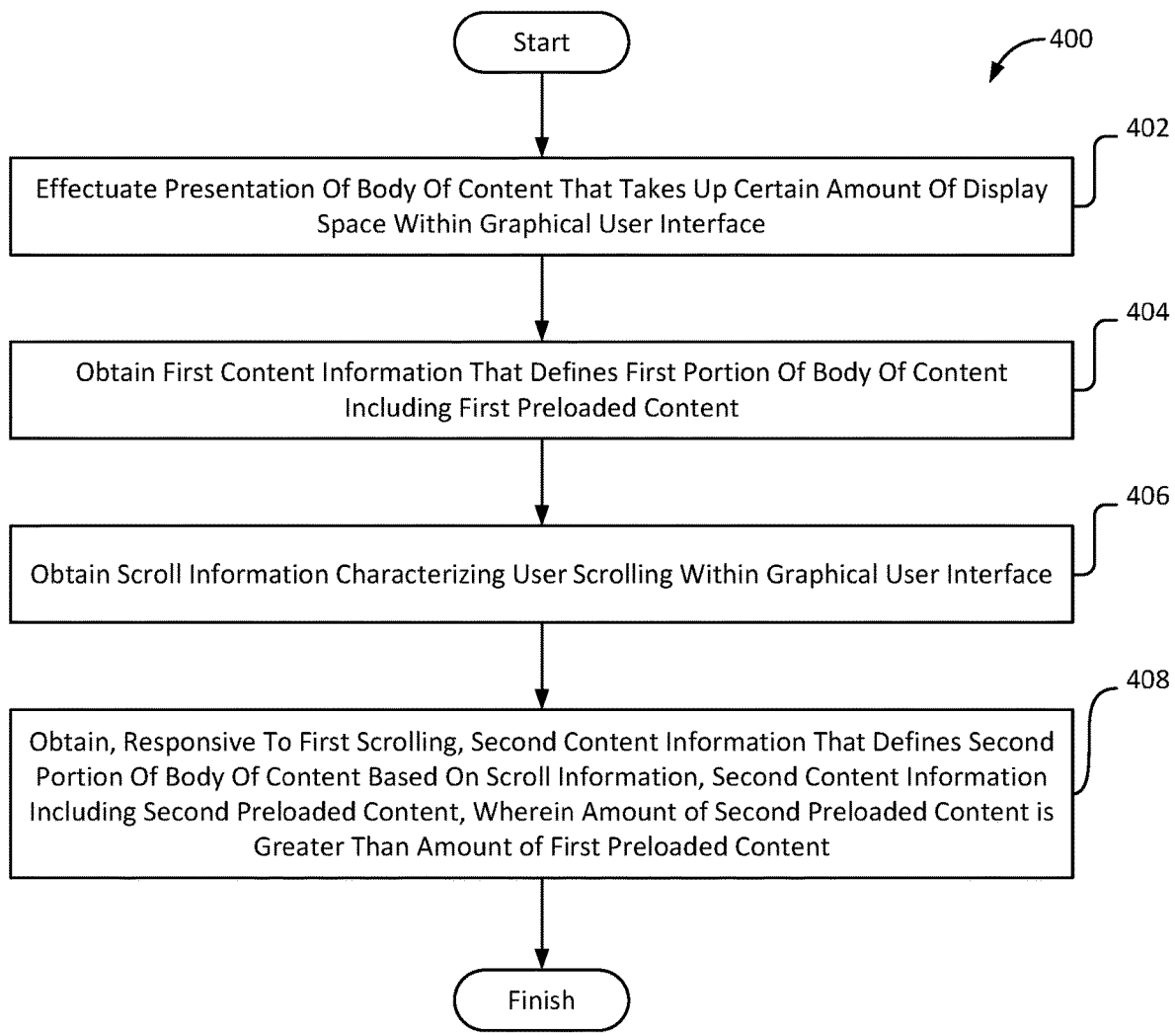
FIG. 4 illustrates a method for preloading an amount of content based on user scrolling, in accordance with one or more implementations.

FIG. 4 illustrates a method 400 for preloading an amount of content based on user scrolling, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some and/or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include effectuating presentation of a body of content that takes up a certain amount of display space within a graphical user interface. A field of view may be a portion of the display space visible to a user and wherein the display space is scrollable such that the field of view is able to be scrolled around the display space to view the body of content. Operation 402 may be performed by one or more physical processors configured by machine-readable instructions including a component that is the same as and/or similar to display space component 108, in accordance with one or more implementations.

An operation 404 may include obtaining first content information that defines a first portion of the body of content. The first portion of the body of content may include both first content presented within a first field of view of the graphical user interface and first preloaded content that is outside the first field of view of the graphical user interface. Operation 404 may be performed by one or more physical processors configured by machine-readable instructions including a component that is the same as and/or similar to caching component 110, in accordance with one or more implementations.

An operation 406 may include obtaining scroll information characterizing user scrolling within the graphical user interface. The scroll information may indicate a first scrolling of the graphical user interface to a second field of view by a first user. Operation 406 may be performed by one or more physical processors configured by machine-readable instructions including a component that is the same as and/or similar to scroll component 112, in accordance with one or more implementations.

An operation 408 may include obtaining, responsive to the first scrolling, second content information that defines a second portion of the body of content based on the scroll information. The second portion of the body of content includes second preloaded content that is outside the second field of view of the graphical user interface. A second amount of the second preloaded may be determined based on the scroll information. The second amount of the second preloaded content included in the second content information may be greater than a first amount of the first preloaded content included in the first content information. Operation 408 may be performed by one or more physical processors configured by machine-readable instructions including a component that is the same as and/or similar to caching component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to preload an amount of content based on user scrolling, the system comprising:
    one or more physical processors configured by machine-readable instructions to:
        progressively increase an amount of preloaded content which is able to be scrolled into a field of view of a display space within a graphical user interface along a direction in proportion to an amount of a body of content a user has viewed while scrolling in the direction, wherein the body of content takes up an amount of the display space within the graphical user interface, wherein the field of view is a portion of the display space visible to the user, wherein the display space is scrollable such that the field of view is able to be scrolled around the display space to view the body of content, and wherein one or more portions of the display space outside the field of view are not visible to the user and include the preloaded content which is able to be scrolled into the field of view.

2. The system of claim 1, wherein the one or more physical processors are further configured by the machine-readable instructions to obtain scroll information including scroll input from the user initiating the scrolling of the graphical user interface.

3. The system of claim 2, wherein the scroll information indicates historical scroll information for the user, the historical scroll information including one or more of an average scroll speed, an average scroll amount, a median scroll amount, an average scroll distance, a median scroll distance, a height and/or amount of content already viewed by the user, a distance of scrolls in relation to maximum page size, a quantity of scrolls in relation to maximum page size, or a length of time since previous scrolling.

4. The system of claim 2, wherein the scroll information indicates a type of content the user is scrolling.

5. The system of claim 1, wherein the body of content includes collaboration environment content, and wherein presentation of the collaboration environment content is effectuated based on environment state information including work unit records, the environment state information defining a state of a collaboration environment including a work unit state, and wherein the work unit state is defined by the work unit records that define values of work unit parameters for units of work managed, created, and/or assigned within the collaboration environment.

6. The system of claim 5, wherein the graphical user interface comprises a work management interface including one or more visual content items corresponding to one or more of the units of work managed, created, and/or assigned within the collaboration environment.

7. The system of claim 1, wherein the one or more physical processors are further configured by the machine-readable instructions to:
    responsive to the scrolling in the direction from a first field of view to a second field of view, preload a first amount of the preloaded content that is outside the second field of view and along the direction, the first amount being proportional to the amount of the body of content viewed within the first field of view and the second field of view; and
    responsive to subsequent scrolling in the direction from the second field of view to a third field of view, preload a second amount of the preloaded content that is outside the third field of view and along the first direction, the second amount being proportional to the amount of the body of content viewed within the first field of view, the second field of view, and the third field of view, wherein the second amount is greater than the first amount.

8. The system of claim 7, wherein the one or more physical processors are further configured by the machine-readable instructions to:
    responsive to further subsequent scrolling in the direction from the third field of view to a fourth field of view, preload a third amount of the preloaded content that is outside the fourth field of view and along the first direction, the third amount being proportional to the amount of the body of content viewed within the first field of view, the second field of view, the third field of view, and the fourth field of view, wherein the third amount is greater than the second amount.

9. The system of claim 1, wherein the one or more physical processors are further configured by the machine-readable instructions to:
    determine that the user is continuously scrolling in the direction; and
    determine the amount of the body of content the user has viewed while continuously scrolling in the direction.

10. The system of claim 9, wherein a determination that the user is continuously scrolling in the direction is responsive to the scrolling reaching and/or surpassing a first threshold amount of scrolling in the direction and/or a first threshold level within the graphical user interface.

11. A method to preload an amount of content based on user scrolling, the method comprising:
    progressively increasing an amount of preloaded content which is able to be scrolled into a field of view of a display space within a graphical user interface along a direction in proportion to an amount of a body of content a user has viewed while scrolling in the direction, wherein the body of content takes up an amount of the display space within the graphical user interface, wherein the field of view is a portion of the display space visible to the user, wherein the display space is scrollable such that the field of view is able to be scrolled around the display space to view the body of content, and wherein one or more portions of the display space outside the field of view are not visible to the user and include the preloaded content which is able to be scrolled into the field of view.

12. The method of claim 11, further comprising obtaining scroll information including scroll input from the user initiating the scrolling of the graphical user interface.

13. The method of claim 12, wherein the scroll information indicates historical scroll information for the user, the historical scroll information including one or more of an average scroll speed, an average scroll amount, a median scroll amount, an average scroll distance, a median scroll distance, a height and/or amount of content already viewed by the user, a distance of scrolls in relation to maximum page size, a quantity of scrolls in relation to maximum page size, or a length of time since previous scrolling.

14. The method of claim 12, wherein the scroll information indicates a type of content the user is scrolling.

15. The method of claim 11, wherein the body of content includes collaboration environment content, and wherein presentation of the collaboration environment content is effectuated based on environment state information including work unit records, the environment state information defining a state of a collaboration environment including a work unit state, and wherein the work unit state is defined by the work unit records that define values of work unit parameters for units of work managed, created, and/or assigned within the collaboration environment.

16. The method of claim 15, wherein the graphical user interface comprises a work management interface including one or more visual content items corresponding to one or more of the units of work managed, created, and/or assigned within the collaboration environment.

17. The method of claim 11, further comprising:
responsive to the scrolling in the direction from a first field of view to a second field of view, preloading a first amount of the preloaded content that is outside the second field of view and along the direction, the first amount being proportional to the amount of the body of content viewed within the first field of view and the second field of view; and
responsive to subsequent scrolling in the direction from the second field of view to a third field of view, preloading a second amount of the preloaded content that is outside the third field of view and along the first direction, the second amount being proportional to the amount of the body of content viewed within the first field of view, the second field of view, and the third field of view, wherein the second amount is greater than the first amount.

18. The method of claim 17, further comprising:
responsive to further subsequent scrolling in the direction from the third field of view to a fourth field of view, preloading a third amount of the preloaded content that is outside the fourth field of view and along the first direction, the third amount being proportional to the amount of the body of content viewed within the first field of view, the second field of view, the third field of view, and the fourth field of view, wherein the third amount is greater than the second amount.

19. The method of claim 11, further comprising:
determining that the user is continuously scrolling in the direction; and
determining the amount of the body of content the user has viewed while continuously scrolling in the direction.

20. The method of claim 19, wherein the determining that the user is continuously scrolling in the direction is responsive to the scrolling reaching and/or surpassing a first threshold amount of scrolling in the direction and/or a first threshold level within the graphical user interface.

* * * * *